United States Patent Office 3,066,027
Patented Nov. 27, 1962

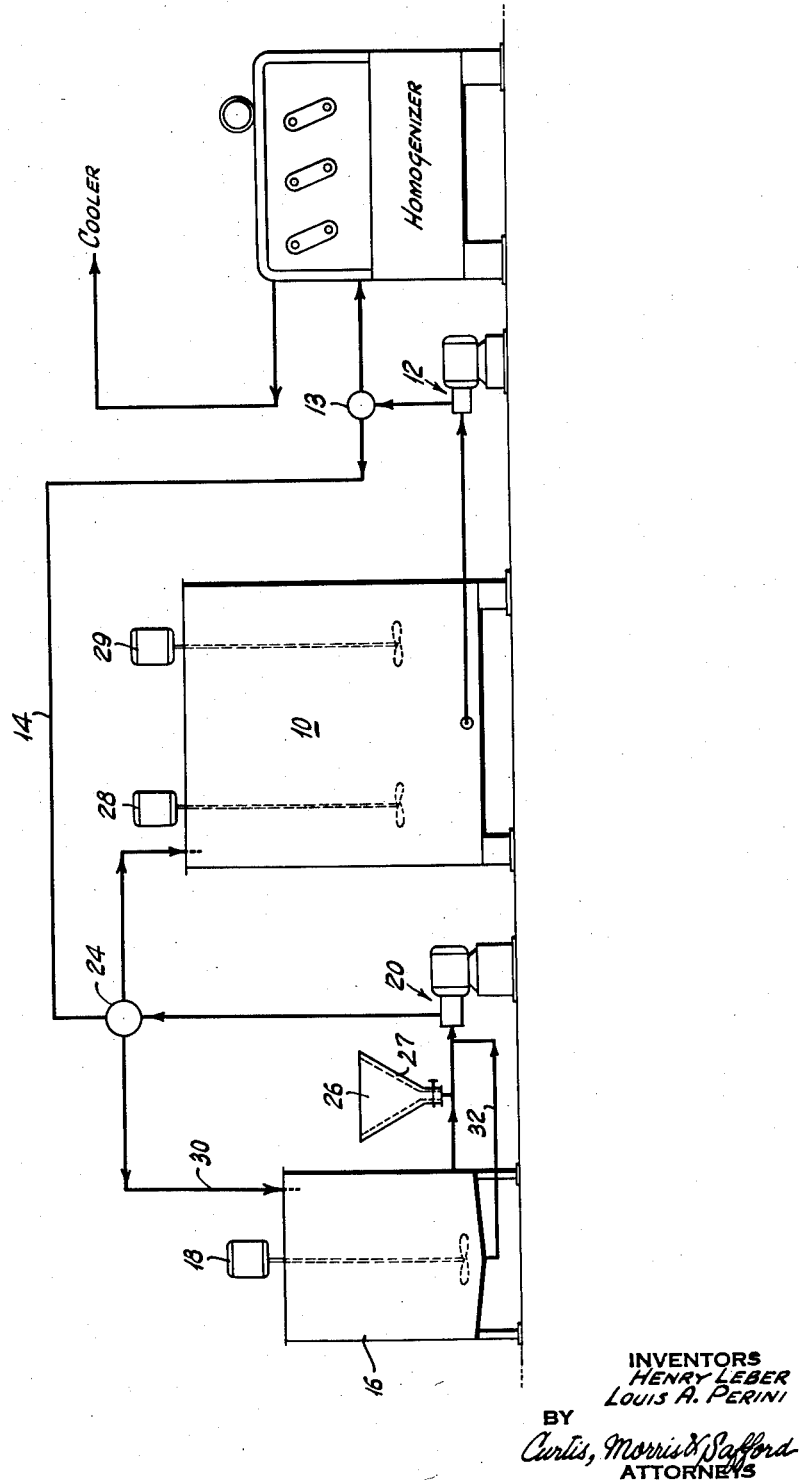

3,066,027
PROCESS FOR MAKING A DAIRY PRODUCT
Louis A. Perini, Liverpool, and Henry Leber, East Syracuse, N.Y., assignors to Dairymen's League Cooperative Association, Inc., Syracuse, N.Y., a corporation of New York
Filed June 29, 1959, Ser. No. 823,513
9 Claims. (Cl. 99—60)

This invention relates to a dairy product and more particularly to a low milk fat content whipping cream of markedly improved whipping characteristics and to a process of making it.

Whipped cream is usually made from a natural dairy cream concentrated to a high milk fat content. Various foamed substitutes for whipped cream have been used; and, although they are recognized as inferior, they are often accepted because of certain recognized disadvantages of genuine whipping cream as heretofore available particularly for restaurants and bakeries. Such a whipping cream has heretofore had to have its milkfat concentrated to about 30% in order to whip easily to a stable fine-textured foam such as is recognized as a good quality of whipped cream. Even then it does not whip into a very large volume, and it may churn into butter instead of whipping to a stable foam. Such high fat whipped cream, if kept too long, tends to separate, or "weep" fluid. At best, such cream needs to be freshly whipped to realize its real quality. All this has restricted its use in bakery products to those which will be delivered to the consumer and eaten at once, i.e., without substantial storage. For many persons on restricted diet, the relatively high fat content of whipping cream is considered a disadvantage, although for others it provides needed nutrition.

As a consequence dairy product research has sought additives to stabilize whipped cream against such separation, to extend it so as to reduce caloric intake and to permit the whipping of lighter cream. For this, various known emulsifiers and/or stabilizers have been tried but without resulting in satisfactory product which can be truly called whipped cream. Such additives have improved one or more properties but deteriorate another or other equally important qualities; e.g., "weeping" of the whipped cream may be decreased but the whip volume ("over-run") may be significantly reduced at the same time.

A common disadvantage of such additives is the adulteration of the taste of the cream or alteration of texture, so that it is unpalatable or of recognizably low quality.

It is therefore an object of this invention to produce a whipping cream of highest quality, made from natural fresh dairy cream but without excessive concentration of butter fat and without adulteration.

It is a further object of this invention to produce this useful whipping cream by a process readily adaptable to existing dairies without need for expensive new equipment.

It has been known that various emulsifiers, among them glyceryl mono-stearate, could cause cream of a low fat content to whip; but the taste was unacceptable. We have now discovered that if the lower glyceryl esters of fatty acids in animal fats and vegetable oils are used in proportion substantially of the range 1–2% by weight of the cream, a light or medium dairy cream can be converted into a high quality whipping cream acceptable to the baking industry as well as to the gourmet. This is surprising as previous efforts to use this material had established that 0.4% was the limit beyond which the product is so unpalatable as to be unsalable; and that, with so small a percentage, a light or medium cream would not whip satisfactorily. We have now discovered that ordinary sweetening and flavoring additions overcome the objection to glyceryl mono-stearate and the monoglycerides when used in amount of 1–2% in cream; although, with higher percentage, the sweetening and flavoring agents tend to accentuate a disagreeable taint.

Glyceryl mono-stearate is a waxy solid at room temperature which has been found very difficult to disperse in cream. Relatively low amounts, up to 0.5% by weight, had been dispersed in milk and cream by violent agitation in high speed blenders (e.g., "Waring blender") and similar laboratory apparatus ill-suited to commercial dairy use. It has been dispersed also by colloid mills and other special emulsifying apparatus, but it seemed evident that it could not be used without costly additions to equipment ordinarily found in a dairy. We have now discovered that glyceryl mono-stearate and the like can be easily dispersed in light cream by passing such ester and cream together through ordinary centrifugal pumps available for conveying milk and cream through pipes in existing dairies. The impact and shear effects of the impeller blades, and their narrow clearances from the pump shell, prove to be surprisingly well adapted to disperse the stearate into colloidal particles or along the aqueous or fat interfaces, under conditions of pumping cream in the dairy. This discovery makes possible commercial production of the improved whipping cream in dairy plants using conventional process equipment.

For best whipping characteristics, we use a fresh dairy cream of the range 18 to 22% milk fat by weight. Broadly stated, between one and two percent by weight of the glyceryl mono-ester is added. This amount can be increased somewhat, but taste will be impaired when more than 2% is used, and any improvement of whipping properties obtained by such higher concentrations is not sufficient to compensate for such impairment. The best range is from 1.3 to 1.8% by weight, as within this range one achieves significant and essential improvement of the several important properties of whipped cream, i.e., stiffness, stability, resistance to "weeping" and satisfactory over-run, without serious deterioration of flavor.

The additive, which functions both as an emulsifier and stabilizer, is chemically a monoester of a polyhydric alcohol and an edible fatty acid. The additive is commercially available in suitably purified form. For further information, see U.S. Patents Nos. 2,634,234, 2,634,278 and 2,634,279.

It has been found also that the glyceryl di-stearate can be used in this invention, especially in amount up to that of the monoglyceride. The monoglyceryl ester of oleic acid can be present, and in general the monoglyceryl esters of the fatty acids of animal fats and vegetable oils ordinarily used in human foods.

Typical of suitable commercially available emulsifier-stabilizer preparations useful for this invention are:

(1)              Glyceryl Monostearate

Chemical and physical data:
    Mono-ester content\_\_\_ 90% (minimum by weight).
    Saponification value\_\_\_ 155–165.
    Iodine value_____ 40 (approx.).
    Glyercol content\_\_\_\_\_ 1% (max.).
    Free fatty acid (as
        oleic)_____ 1.5% (max.).
    Congealing point\_\_\_\_\_ 58° C. (approx.).
    Clear point_____ 62° C. (approx.).

(2)        Glyceryl and Di-stearate Mixture

Chemical and physical data:
    Monoester content_____ 40–44% (by weight).
    Iodine value_____ 55–60.
    Glycerol content_____ 1% (max.).
    Free fatty acid (as oleic)\_\_\_ 0.5% (max.).
    Melting point_____ 50° C. (approx.).

One serious defect, which has heretofore prevented the use of the mono and di-glyceryl esters of the fatty acids (as stabilizers and/or emulsifiers) in edible dairy products, is the unpalatable flavor of the free fatty acid. It appears impossible to avoid the presence of some free fatty acid, as the ester undergoes some hydrolysis. It is a feature of this invention that it enables one to avoid the unpalatable taste in the modified whipping cream. For reasons not fully understood, the addition of a sweetening agent equivalent to about 10 to about 15% by weight of cane sugar and a trace of flavoring extract makes both the whipping cream and the whipped cream of excellent taste and palatability. Ordinarily the best sweetening agent is sucrose, and ordinarily the best flavoring agent is vanilla extract. Other sweetening agents include glucose, honey, sorbitol and similar substances; even saccharin may be used but with the usual adjustment of proportions to give equivalent sweetening effect.

The glyceryl monostearate is not soluble in aqueous liquids, such as light whipping cream; and, in fact, it has proven very difficult, under practical operating conditions to produce a satisfactory uniform dispersion of as small an amount as one percent in an aqueous material such as cream.

We have now discovered that the glyceryl mono-stearate can be readily dispersed into a milk product in existing dairy plants. Our novel process features the use of apparatus generally available in existing milk processing plants, namely, a high speed centrifugal pump of sanitary design. Thus, by our invention, dispersion of the emulsifier for producing our novel whipping cream is broadly characterized by the step of transporting a mixture of emulsifier and light or medium cream (i.e., with at least 18% and less than 28% butter fat) by action of a high speed centrifugal dairy pump.

In the accompanying drawings, we have shown diagrammatically such dairy apparatus suitably arranged for carrying out the present invention.

In this drawing a standard pasteurizing vat 10 receives a supply of the fresh dairy cream. A pump 12 draws off cream from the bottom of the vat 10 through a pipe connection and delivers it through valve 13 and pipe 14. A pre-mix tank 16 located nearby is provided with a propeller-type mechanical mixer 18 which is directed in the tank so as to maintain a vortex in which any floating pieces of the glyceryl stearate can be carried down into the mass of liquid in the tank. From the bottom of the pre-mix tank 16 the mixture is drawn off through a pipe connection 32 by pump 20 and delivered through the pipe connection 22 to the four-way valve 24, by which the mixture can be recycled through connection 30 to the pre-mix tank 16 or passed onto the tank 10.

A feed hopper 26 is shown connected into a by-pass connection from the tank 16 to pump 20. Into this the glyceryl stearate material, suitably comminuted, is fed and, through it, is fed into the flow of cream into the pump 20.

Mechanical stirrers 28 and 29 are provided in the vat 10 to thoroughly mix into the cream the pre-mix supplied to the vat through the pipe 22 and the valve 24 and its connection.

The valve 13 is shown as a three-way valve by which the cream from the pump 12 can be recycled through pipe 14 and valve 24, or can be passed on into the homogenizer and cooler and/or other usual dairy apparatus. Advantageously, the cream has at least 18% by weight milk fat and advantageously, is treated while warm (e.g., at a pasteurizing temperature). Thus the emulsifier is thoroughly and stably dispersed in the cream without special equipment.

The cream is advantageously heated to a temperature in the range 160° to 200° F. (or, at the outside, 145° to 210° F.) by introducing into a pasteurizing vat and the temperature then held at 165° to 170° F. Generally stated, the temperature of the cream during the mixing is above the cloud point of the emulsifier, but not so high as to leave an unpalatable "boiled" taste in the cream. Heating above about 170–180° F. develops an antioxidant in the cream which results in better frozen storage, where that is necessary, but it gives the cream a "boiled" taste. Although this may be objectionable to users, it tends to disappear on storage, so that cream which is to be stored may advantageously be treated at higher temperatures, even up to 210° F.

During this heating the sweetening agent, e.g., about 10–15% of sucrose or equivalent, is dissolved in the cream.

The sweetened cream is then drawn off to the centrifugal pump and the glyceryl mono-stearate added in transit.

The glyceryl mono-stearate is supplied commercially as a waxy solid with relatively low melting point (e.g., "Myverol 1800" or "1830" sold by Distillation Products Industries division of Eastman Kodak Company, or "Atmul 80" sold by Atlas Powder Co.). It has been successfully introduced as small pieces of the waxy solid into a vat of hot cream and then, after it is softened, passing the mix through a high speed centrifugal pump, with unrestricted flow less than the full capacity of the pump, as herein described; or the waxy pieces can be fed into the cream in the input stream of the high speed centrifugal pump as small pea-sized pellets; or it can be melted and sprayed into the cream; or it can be melted and fed into a flowing stream of the cream. If the glyceryl mono-stearate is melted, care must be taken to avoid oxidative breakdown or other production of objectionable products, such as free fatty acids, by excessive or extended heating.

This novel use of a high speed centrifugal pump as a means for dispersing or solubilizing the additive permits considerable latitude of operation. The emulsifier can be added to a part of the cream and the resulting mixture then blended with the rest of the cream or the emulsifier can be added to all the cream. It can be added as a proportioned liquid or as a spray. The glycerol monostearate can be melted by holding it at an ambient temperature of from 145° to 200° F., but its storage as a liquid should be limited as pointed out above, as to time and temperature, e.g., less than 12 hours at 200° F. This permits continuous operation of the process.

Alternatively, the solid can be readily introduced by cutting it into pea-sized pieces which are added to an aliquot of the heated cream to form a pre-mix. These pieces are added at the rate of from 10 to 20 pounds per minute; and the aliquot is from 10 to 20% by weight, of the total cream-sucrose mixture. This addition is immediately before the intake of the high speed centrifugal pump.

One highly satisfactory centrifugal pump has a throughput capacity of 108,680 pounds of product per hour operating at 3500 r.p.m. It has a pump shell measuring 7 inches in diameter and 1⅜ inches thick with 1½ inch inside diameter axial inlet and 1¼ inch inside diameter tangential discharge openings and a flat diametric blade impeller 4⅛ inches long fitted in the interior of the pump shell, and secured on the end of the pump shaft. Better dispersion and/or solubilization results were obtained when the flow through the pump was unrestricted, than when the pump was starved or the discharge valved.

The emulsifier can be added as a solid in small pieces or as a melt. When it is added as a solid, it is best to make a pre-mix by recirculating some of the cream through the centrifugal pump for a short period of time, e.g., 10 to 15 minutes after adding all of the glyceryl mono-stearate. During this recirculation the mixture is pumped to and from a separate pre-mix vat keeping the temperature of the pre-mix above about 160° F., meanwhile agitating the liquid in the vat, e.g., by a propeller type stirrer so as to avoid stratification and local overcooling.

At the end of the recirculation period, the pre-mix is diverted into the bulk of the cream, also heated to 165–170° F. The pre-mix, which carries from 5 to 20% by weight of the emulsifier, is readily distributed throughout the bulk of the cream by agitation, as by a means of a mechanical stirrer, or it may be added to the feed of a centrifugal pump by which it is transferred.

At this stage pasteurization of the cream can be concurrent with solubilizing and dispersion of the emulsifier. The modified cream is held at a temperature of from 160–200° F., preferably 165–170° F., for about 30 minutes. After 25 of the 30 minutes have elapsed, the flavor agent is added, which for whipping cream is advantageously vanilla extract. Almond extract, lemon extract, etc., can be substituted if desired. It is added in small amount, to taste. Thereafter, the product is advantageously homogenized by conventional techniques, e.g., at 2500 p.s.i. and 500 p.s.i. and then chilled and put into containers for storage.

The product of the invention is a whipping cream of from 18 to 22% milk fat; and is a soft plastic in physical structure and appearance. It is a dairy product of lower milk fat content than ordinary whipping creams, yet it always whips into a large volume of whipped cream of exceptional stiffness and stability. The whipped cream does not exude fluid on standing. Furthermore, the whipping cream shows no inclination to churn into butter when whipped.

The accompanying drawings show, in diagrammatic view, apparatus used in the present invention.

EXAMPLE I

As an example of both the product and process of the invention, 4,500 pounds of product, whipping cream, is made from 3,937.5 pounds of cream having a milk fat content of 20.57% by weight. This is introduced into a pasteurizing vat, illustrated diagrammatically at 10 in FIGURE 1 of the accompanying drawing, and heated to 165–170° F. To this is added with agitation 495 pounds of sucrose which quickly dissolves in the heated cream. 440 pounds of the sweetened cream is pumped through pump 12, 3-way valve 13 and line 14 to a pre-mix tank 16 having a propeller-type mechanical mixer 18 for agitation of the contents. The tank contents are drawn off through a high speed centrifugal pump 20 of sanitary design (Model BH of the Cherry, Burrell Corporation, Little Falls, New York) having a discharge rate of 108,680 pounds per hour, and at first recycled through pipe 22 and 4-way valve 24 to the pre-mix tank 16.

67.5 pounds of the glyceryl mono-stearate chopped into pea-sized particles is fed into the circulating sweetened cream at 26, at the intake of the centrifugal pump 20 at a rate of 20 pounds per minute (1.1% of the cream throughput). After all of the glyceryl mono-stearate has been added, recirculation to tank 16 is continued for 10 to 15 minutes and then the pre-mix output from the pump is diverted by valve 24 to the pasteurizing vat 10 where it is mixed with the bulk of the sweetened cream. Agitation is maintained by two mechanical stirrers 28, 29 operating in the pasteurizing vat.

The now mixed product is held in the vat with gentle mixing, still at a temperature of 165–170° F., for twenty-five minutes. At this time vanilla extract is added, as required for optimum taste. After an additional five minutes mixing under these conditions, the product is homogenized in a homogenizer equipped with two homogenizing valves, at 2500 p.s.i. and 500 p.s.i., cooled to a temperature of 50° F. or lower, and packaged for storage and distribution.

The product is of excellent taste, and contains 18.00% milk fat, 11.00% sucrose and 1.50% glyceryl mono-stearate, plus the small addition of vanilla flavoring (all percentages by weight).

EXAMPLE II

Fresh dairy cream, separated to about 20.57% milk fat, is put into a pasteurizing vat 10 and sweetened with sucrose to 11% sugar content, the mixture being meanwhile heated and agitated until it reaches a temperature in the range 160–185° F.

A portion of this sweetened cream is then drawn off by pump 12 and passed through valve 13, pipe 14, valve 24 and pipe 30 into pre-mix tank 16, all as in Example I. Glyceryl mono-stearate emulsifier is added as pea-sized chunks to the liquid in the pre-mix tank. The hot liquid and emulsifier are agitated in the tank until the emulsifier is soft, at which time the pre-mix is drawn off to the pump 20, the agitator 18 being directed so as to maintain a vortex down which the floating chunks of emulsifier pass to the outlet pipe 32. The pump 20 disperses the monoglyceride emulsifier thoroughly in the cream.

From the pump 20 the pre-mix is directed through the valve 24 (now turned to make connection to the pasteurizing vat 10) and thence into the vat 10 where the pre-mix is blended with the rest of the sweetened cream.

Proportions and temperatures and subsequent treatment may be the same as in Example I.

EXAMPLE III

Instead of adding the chunks of solid emulsifier to the cream at 26, as described in Example I, the hopper 26 may be heated by steam at 5–15 p.s.i. pressure in the jacket 27 or by circulating hot water in the jacket at 190–200° F. (or by electric heating element). The emulsifier, when melted by this heating, is then mixed into a stream of the sweetened cream, advantageously being fed therein by an aspirator, injector or eductor. The outlet of the pump is directed by valve 24 back through the connection 30 to the vat 16 until all of the emulsifier is dispersed therein, or alternatively the cream and sweetener may be fed into vat 16 and pre-mixed therein and the cream may pass once through the aspirator, which feeds therein a stream of the melted emulsifier equal to 1.5% by weight of the cream, and then once through the centrifugal pump 20 and on through the pasteurizing and homogenizing treatments, finally being filled into containers and cooled to 50° F., or lower, for storage and distribution.

Similarly the glyceryl mono-stearate could be added with an equal amount of the glyceryl di-stearate as available in the previously mentioned commercial form. In that event it is desired that at least 1% by weight of the monoglyceride be incorporated into the sweetened cream.

The following representative data shows the influence of the concentration of the glyceryl mono-stearate on the several important properties of 18% milk fat whipping cream.

TABLE I

[18% milk fat cream whipped for 15 min.]

| | Concentration of glyceryl mono-stearate, percent by weight | Percent over-run | Relative stiffness [1] (grams/in.[2]) | Drainage from whipped product [2] | |
|---|---|---|---|---|---|
| | | | | 24 hrs. at 40° F. | 48 hrs. at 40° F. |
| 1 | 1.0 | 218 | 66 | 3.0 | 4.0 |
| 2 | 1.2 | 277 | 78 | 2.0 | 2.0 |
| 3 | 1.4 | 245 | 108 | 0 | 0.5 |
| 4 | 1.6 | 227 | 110 | 0 | 0 |
| 5 | 1.8 | 227 | 120 | 0 | 0 |

[1] A 200 ml. beaker was filled with whipped product and a one-inch square plate was forced through the product resulting in a comparative stiffness reading.
[2] 100 grams of whipped product was stored on an 80 mesh screen square and the fluid draining therefrom collected and measured.

While the process of the invention has been described in considerable detail with reference to the incorporation of the glyceryl mono-stearate into cream of 18% milk fat, it will be understood that the invention is clearly applicable to incorporation of such materials of limited solubility into other dairy products and the like. There-

We claim:

1. A process for making an improved whipping cream which comprises mixing dairy cream of from 18% to 22% milk fat by weight with a sugar to produce a pleasantly sweet taste, heating said mixture to a temperature of the range 160–200° F. mixing into the resulting sweetened cream glyceryl monostearate in a proportion of the range 1–2% by weight of the final product, circulating and agitating the mixture at the elevated temperature with mild impact and shear forces applied to the mixture, pasteurizing said mixture while maintaining agitation, adding a flavoring near the end of said pasteurizing, homogenizing said pasteurized mixture and thereafter cooling the homogenized cream.

2. The process of claim 1 in which the glyceryl monostearate is added as a solid in small chunks.

3. The process of claim 1 in which the glyceryl monostearate is melted and added as a liquid.

4. The process of claim 1 in which the glyceryl monostearate is melted and atomized and mixed with the cream.

5. The process of claim 1 in which the said sweetened cream with mono-stearate is successively subjected to impact and shear effects by recirculating and agitating the mixture.

6. The process of claim 1 in which the temperature of the said sweetened cream with mono-stearate is maintained within the range 145° to 210° F. for ¼ to 1¼ hours.

7. The process of claim 1 in which the temperature of the said sweetened cream with mono-stearate is maintained within the range 160° to 180° F.

8. The process for preparing an improved whipping cream from a dairy cream having at least 18% and less than 28% milk fat which comprises circulating and agitating a heated mixture of glyceryl mono-stearate and sweetened light cream while subjecting it to mild impact and shear forces, whereby the glyceryl mono-stearate in an amount within the range 1 to 2% by weight of the improved whipping cream product is dispersed throughout said mixture, and mixing the resulting dispersion with from 5 to 10 times its volume of warm sweetened light cream.

9. A process for preparing an improved whipping cream from dairy cream having at least 18% and less than 28% by weight milk fat which comprises dispersing a lower glyceryl stearate emulsifier in an amount from 5 to 20% by weight of the warm sweetened light cream and within the range 1 to 2% by weight of the improved whipping cream product, and mixing the resulting dispersion with from 5 to 10 times its volume of warm sweetened cream.

References Cited in the file of this patent

UNITED STATES PATENTS

| | | |
|---|---|---|
| 1,816,339 | Musher | July 28, 1931 |
| 1,958,295 | Christensen et al. | May 8, 1934 |
| 2,049,591 | Rafn | Aug. 4, 1936 |
| 2,137,899 | Phelps | Nov. 22, 1938 |
| 2,407,027 | Mason et al. | Sept. 3, 1946 |
| 2,931,730 | Schram | Apr. 5, 1960 |

FOREIGN PATENTS

| | | |
|---|---|---|
| 518,050 | Great Britain | Feb. 15, 1940 |

OTHER REFERENCES

Jacobs, M. B.: "Synthetic Food Adjuncts," 1947, Van Nostrand Co., New York, page 253.

Blanch, F. C.: "Handbook of Food and Agriculture," 1955, Reinhold Pub. Co., N.Y., pages 653 and 655.

Data Sheet distributed by Distillation Products Industries, Division of Eastman Kodak Company of Rochester, Jan. 3, 1955, entitled "The Use of Mineral Distilled Monoglycerides in the Preparation of Whipped Foods Based on Dairy Products," 4 pages.